United States Patent
Guan et al.

(10) Patent No.: US 9,104,802 B2
(45) Date of Patent: Aug. 11, 2015

(54) STACK OVERFLOW PROTECTION DEVICE, METHOD, AND RELATED COMPILER AND COMPUTING DEVICE

(71) Applicant: International Business Machines Corporation, Armonk, NY (US)

(72) Inventors: Xiao Feng Guan, Shanghai (CN); Jin Song Ji, Shanghai (CN); Jian Jiang, Shanghai (CN); Si Yuan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/772,858

(22) Filed: Feb. 21, 2013

(65) Prior Publication Data
US 2013/0219373 A1 Aug. 22, 2013

(30) Foreign Application Priority Data

Feb. 22, 2012 (CN) .......................... 2012 1 0041865

(51) Int. Cl.
*G06F 9/44* (2006.01)
*G06F 9/45* (2006.01)
*G06F 11/36* (2006.01)

(52) U.S. Cl.
CPC .......... *G06F 11/3644* (2013.01); *G06F 9/4425* (2013.01); *G06F 11/3624* (2013.01); *G06F 8/41* (2013.01)

(58) Field of Classification Search
CPC ............ G06F 11/3644; G06F 11/3624; G06F 9/4425; G06F 8/41
See application file for complete search history.

(56) References Cited

U.S. PATENT DOCUMENTS

| 5,909,580 | A | 6/1999 | Crelier et al. | |
| 6,560,774 | B1 * | 5/2003 | Gordon et al. | 717/146 |
| 7,086,088 | B2 | 8/2006 | Narayanan | |
| 7,152,229 | B2 * | 12/2006 | Chong et al. | 717/146 |
| 7,263,693 | B2 * | 8/2007 | Heeb | 717/151 |
| 7,685,574 | B2 * | 3/2010 | Brumme et al. | 717/130 |
| 7,814,333 | B2 | 10/2010 | Choi et al. | |
| 2001/0013094 | A1 * | 8/2001 | Etoh et al. | 712/227 |
| 2004/0015901 | A1 * | 1/2004 | Koseki et al. | 717/140 |
| 2004/0073897 | A1 * | 4/2004 | Schwabe | 717/151 |
| 2004/0088686 | A1 * | 5/2004 | Yamamoto et al. | 717/140 |
| 2004/0103252 | A1 * | 5/2004 | Lee et al. | 711/132 |
| 2004/0168078 | A1 * | 8/2004 | Brodley et al. | 713/200 |

(Continued)

OTHER PUBLICATIONS

Maciej Ogorkiewicz, Analysis of Buffer Overflow Attacks, 2002, p. 1-11.*

(Continued)

*Primary Examiner* — Thuy Dao
*Assistant Examiner* — Mongbao Nguyen
(74) *Attorney, Agent, or Firm* — Holland & Knight LLP; Brian J. Colandreo, Esq.; Jeffrey T. Placker, Esq.

(57) ABSTRACT

The present disclosure relates to a stack overflow protection device and a stack protection method. According to the present disclosure, a stack overflow protection device is provided, which includes a dividing unit configured to divide at least one function in the input codes into a code region with a string operation and a code region without a string operation. The device also includes a stack protection unit configured to set up stack protection in the code region with a string operation. The present disclosure further provides a stack protection method.

12 Claims, 8 Drawing Sheets

(56) References Cited

U.S. PATENT DOCUMENTS

| | | | |
|---|---|---|---|
| 2006/0026574 A1* | 2/2006 | Lesot et al. | 717/140 |
| 2006/0095895 A1* | 5/2006 | K. | 717/130 |
| 2007/0285271 A1 | 12/2007 | Erlingsson et al. | |
| 2008/0028379 A1* | 1/2008 | Stichnoth | 717/151 |
| 2008/0276063 A1* | 11/2008 | Kim et al. | 711/171 |
| 2009/0144709 A1* | 6/2009 | Donohue et al. | 717/146 |
| 2009/0259989 A1* | 10/2009 | Cifuentes et al. | 717/110 |
| 2010/0095069 A1* | 4/2010 | Asher et al. | 711/132 |
| 2013/0074051 A1* | 3/2013 | Freeman | 717/130 |
| 2013/0283245 A1* | 10/2013 | Black et al. | 717/130 |

OTHER PUBLICATIONS

John Regehr, Eliminating stack overflow by abstract interpretation, 2003, pp. 1-16.*

Gerardo Richarte, Four different tricks to bypass StackShield and StackGuard protection, 2002, pp. 4-9.*

Kyung-suk Lhee, Buffer Overflow and Format String Overflow Vulnerabilities, 2002, pp. 1-16.*

Younan et al., "Extended Protection Against Stack Smashing Attacks Without Performance Loss," IEEE, Dec. 26, 2006, pp. 1-10.

Ozdoganoglu et al, "SmashGuard: A Hardware Solution to Prevent Security Attacks on the Function Return Address," IEEE, Dec. 28, 2006, pp. 1-35.

Huynh, "Performance Overhead of Buffer Overflow Prevention Tools," 2005, pp. 1-5.

Wu, "The Potentials and Challenges of Trace Compilation: Lessons Learned from Building a Trace-JIT On Top of J9 JVM," http://researcher.ibm.com/researcher/files/us-pengwu/challeng-potential-trace-compilation.pdf, Jan. 26, 2011, pp. 1-33.

Frykholm, "Countermeasures Against Buffer Overflow Attacks," http://www.rsa.com/rsalabs/node.asp?id=201, Nov. 30, 2000, pp. 1-9.

* cited by examiner

STACK OVERFLOW PROTECTION DEVICE, METHOD, AND RELATED COMPILER AND COMPUTING DEVICE

RELATED APPLICATIONS

This application is based on and claims the benefit of priority from Chinese Patent Application 201210041865.3, filed on Feb. 22, 2012, the entire disclosure of which is incorporated herein by reference.

TECHNICAL FIELD

The present disclosure generally relates to a stack overflow protection device and a stack protection method. More specifically, the present disclosure relates to stack overflow protection optimization using function level transformation.

DESCRIPTION OF THE RELATED ART

Figure 1A:
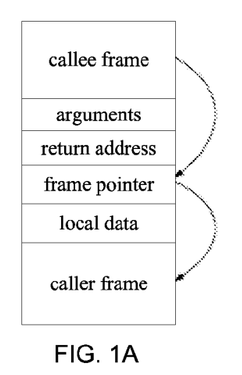
FIGS. 1A~1C show a diagram of stack overflow.
Figure 1B:
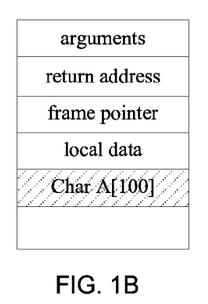
Figure 1C:
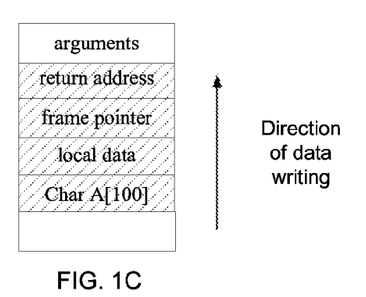

Stack overflow is a factor that must be considered at the time of designing a program. FIGS. 1A~1C schematically show a stack overflow. FIG. 1A shows an example structure of frames in a stack. In FIG. 1A, the stack contains callee frame, arguments, return address, frame pointer, local data and caller frame therein, for example. As shown, when a function call occurs, the callee frame can find the position of the caller frame through the frame pointer. The argument, the return address and the frame pointer can be used at the time of function call.

As shown in FIG. 1B, the function may involve string operations, for example, char A [100] represents an array containing 100 characters. When the function contains a string operation, stack overflow may be induced. FIG. 1C shows a situation of an example stack overflow. When more than 100 characters are written into string A [100] (for example, an error occurs or an unexpected situation appears), redundant characters may go beyond the range of string A and overwrite the local data, such as the frame pointer, the return address or the like, in the stack, as shown in FIG. 1C. That is, stack overflow occurs. This possibly causes the local data to be destroyed and the function call to be short of necessary return conditions. As a result, it is necessary to take stack overflow protection into consideration when input codes are processed at a compiler.

Figure 2A:
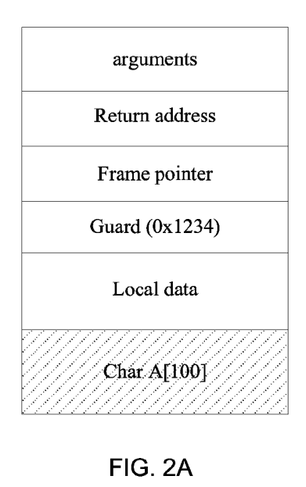
FIGS. 2A and 2B show a conventional stack protection method.
Figure 2B:
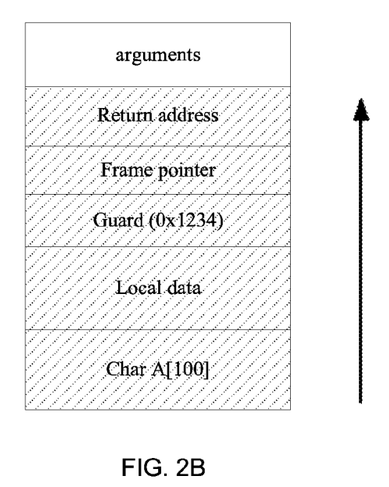

Stack protection is a functionality provided by many commercially available compilers, such as GCC compiler of GUN, IBM® XL compiler, Visual Studio Compiler from Microsoft. There are numerous stack protection methods, a typical one of which is inserting a guard. FIG. 2A shows an example of guard application. For a stack to be protected, a guard can be appropriately inserted and checked to achieve stack protection. For example, as shown in FIG. 2A, a value 0x1234 is inserted into a proper position of the stack when entering a function. If the string in the function is excessively written, this value will be overwritten. Thus, when leaving the function, as shown in FIG. 2B, if it is detected that the guard is rewritten (for example, it is changed to 0x5678 in the figure), a situation of stack overflow is detected. The compiler is responsible for adding additional codes to the source codes, thereby realizing the above stack protection work.

However, in order to avoid stack overflow, guard setup and check must be done for every function involving string operations. Due to additional operations introduced by a compiler, significant performance loss may occur. On the other hand, an aspect for evaluating the performance of a compiler may be to evaluate the operational performance of a target program generated after compiling source codes.

In some compilers, some optimization methods for stack overflow protection have been proposed. For example, when taking stack protection, functions without string operations can be treated as safe. In such way, these functions can be avoided from stack protection, and thus performance loss can be avoided as well. However, this method works only for the functions without string operations. As for those functions involving string operations, all of them should be protected.

SUMMARY OF THE DISCLOSURE

According to an aspect of the present disclosure, a device for providing input codes with stack overflow protection is provided, which comprises: a dividing unit configured to divide at least one function in the input codes into a code region with a string operation and a code region without a string operation; and, a stack protection unit configured to set up stack protection in the code region with a string operation.

According to another aspect of the present disclosure, a method for providing input codes with stack overflow protection is provided, which comprises: dividing at least one function in the input codes into a code region with a string operation and a code region without a string operation; and, setting up stack protection in the code region with a string operation.

The present disclosure may, in some embodiments, further provide a compiler comprising the stack overflow protection device described in the above aspects of the present disclosure.

The present disclosure may, in some embodiments, further provide a computing device comprising the compiler described in the above aspects of the present disclosure.

BRIEF DESCRIPTION OF THE DRAWINGS

The example embodiments of the present disclosure will be described in greater detail in conjunction with the accompanying drawings. The above and other objects, features and advantages of the present disclosure will become more apparent, wherein, in the exemplary embodiments of the present disclosure, same reference numbers generally represent same components.

DETAILED DESCRIPTION OF EXAMPLE EMBODIMENTS

Below, the example embodiments of the present disclosure will be described in greater detail with reference to the accompanying drawings. Although the example embodiments of the present disclosure have been shown in the accompanying drawings, it should be understood that, the present disclosure can be implemented in various forms, but not limited to the embodiments described herein. In contrast, these embodiments are provided for making the present disclosure more thorough and complete and for conveying the scope of the present disclosure completely to one of ordinary skill in the art.

Figure 10:
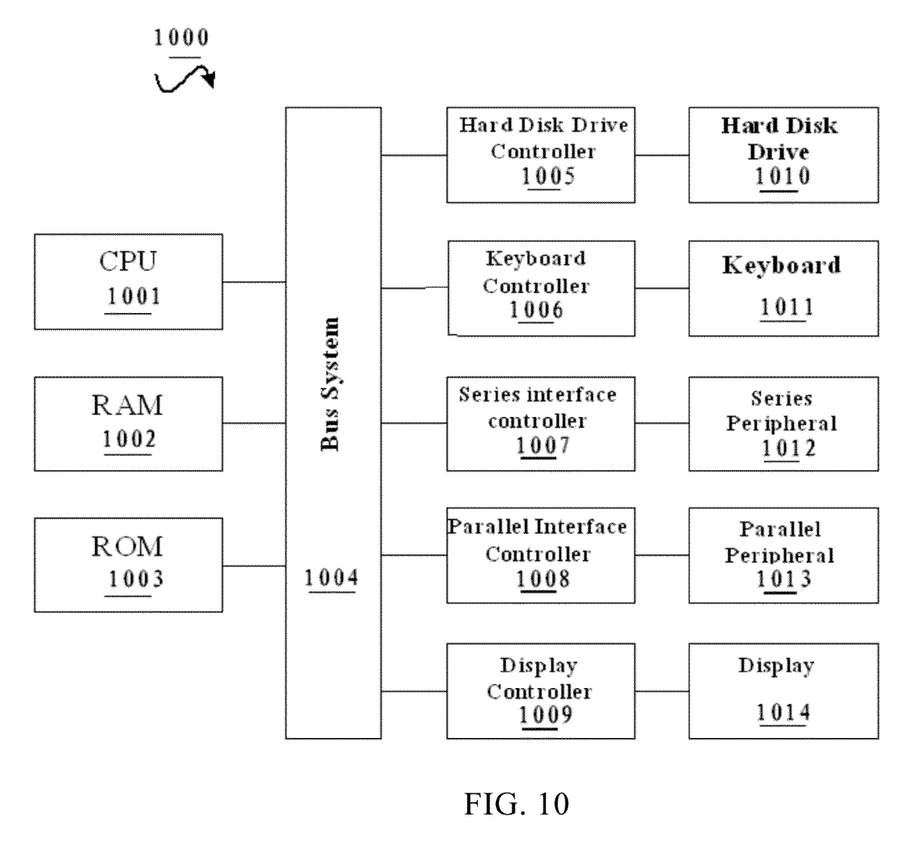
FIG. 10 shows a block diagram of an example computing system 1000 suitable for implementing the embodiments of the present disclosure.

FIG. 10 shows a block diagram of an example computing system 1000 suitable for implementing the example embodiments of the present disclosure. As shown in FIG. 10, the computing system 1000 may include: CPU (Central Process Unit) 1001, RAM (Random Access Memory) 1002, ROM (Read Only Memory) 1003, System Bus 1004, Hard Drive Controller 1005, Keyboard Controller 1006, Serial Interface Controller 1007, Parallel Interface Controller 1008, Display Controller 1009, Hard Drive 1010, Keyboard 1011, Serial Peripheral Equipment 1012, Parallel Peripheral Equipment 1013 and Display 1014. Among above devices, CPU 1001, RAM 1002, ROM 1003, Hard Drive Controller 1005, Keyboard Controller 1006, Serial Interface Controller 1007, Parallel Interface Controller 1008 and Display Controller 1009 are coupled to the System Bus 1004. Hard Drive 1010 is coupled to Hard Drive Controller 1005. Keyboard 1011 is coupled to Keyboard Controller 1006. Serial Peripheral Equipment 1012 is coupled to Serial Interface Controller 1007. Parallel Peripheral Equipment 1013 is coupled to Parallel Interface Controller 1008. And, Display 1014 is coupled to Display Controller 1009. It should be understood that the structure as shown in FIG. 10 is only for the purpose of example rather than any limitation to the present disclosure. In some cases, some devices may be added to or removed from the computer system 100 based on specific situations.

As will be appreciated by one of ordinary skill in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Stack protection strategy may often not involve avoiding performance loss caused by unnecessary safety monitoring and protection by changing global function structure, function call relation or flow chart within function body. The present disclosure may provide a compiling device having better compiling performance and high execution efficiency and a method thereof.

It should be appreciated that, the term "string operation" used herein should be broadly construed such that it not only includes normal string operations (e.g. char) but also intends to cover all operations that possibly cause stack overflow. By way of example, an object pointed by a pointer may also be a string operation. Thus, pointers with an unknown type to the compiler also belong to operations that may possibly result in stack overflow. One of ordinary skill in the art will know other operations that possibly result in stack overflow.

According to one embodiment of the present disclosure, based on whether or not the respective functions in the source codes involve string operations, stack protection can be set up on a certain code region within the function. In one embodiment, the code region with a string operation can be outlined to be a new function which serves as a callee function of the original function. Thus, in some embodiments, it may only be necessary to provide stack protection for the code region (the callee function) with a string operation, while it may be unnecessary to protect other parts of the original function. Therefore, the execution efficiency of the target code after compilation can be enhanced. According to the following description, the above and other aspects of the present disclosure will become more apparent.

Figure 3:
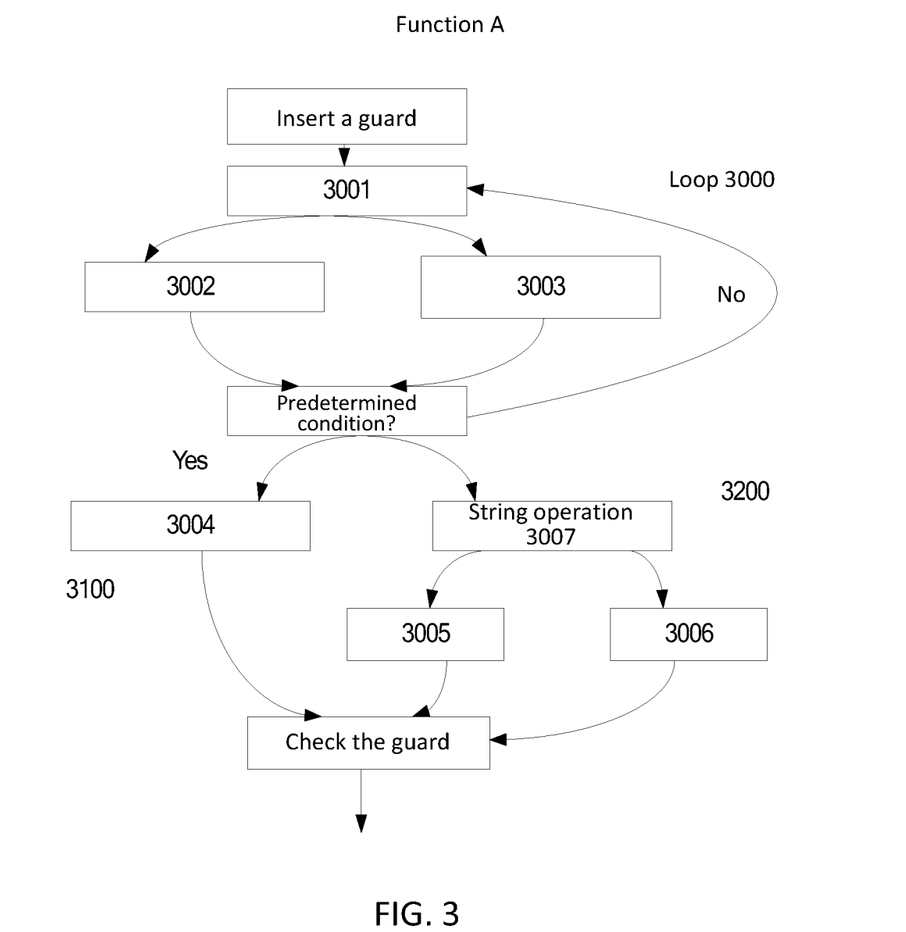
FIG. 3 shows an existing stack protection for a function A.

FIG. 3 shows a diagram of technique of stack protection for the example function A. As shown in the figure, when the program goes into function A, a guard may be first set up. When the execution of program leaves function A, the guard may be checked. In function A, the code part 3001-3006 can represent any code segment that does not contain string operations. As shown in the figure, since function A contains a string operation 3007, it may be necessary to deploy stack protection each time function A is called, so as to prevent stack overflow. The compiler of such a technique may thus insert a guard immediately when entering function A and checks the guard when leaving function A.

When analyzing the example function A, it can be considered that function A includes the following three parts: loop 3000, code region 3100 and code region 3200. It can be found that, not all of the code regions contain string operations. Particularly, when loop 3000 meets a jump condition, if code region 3100 is executed, then the execution of function A may not involve string operations.

Figure 4:
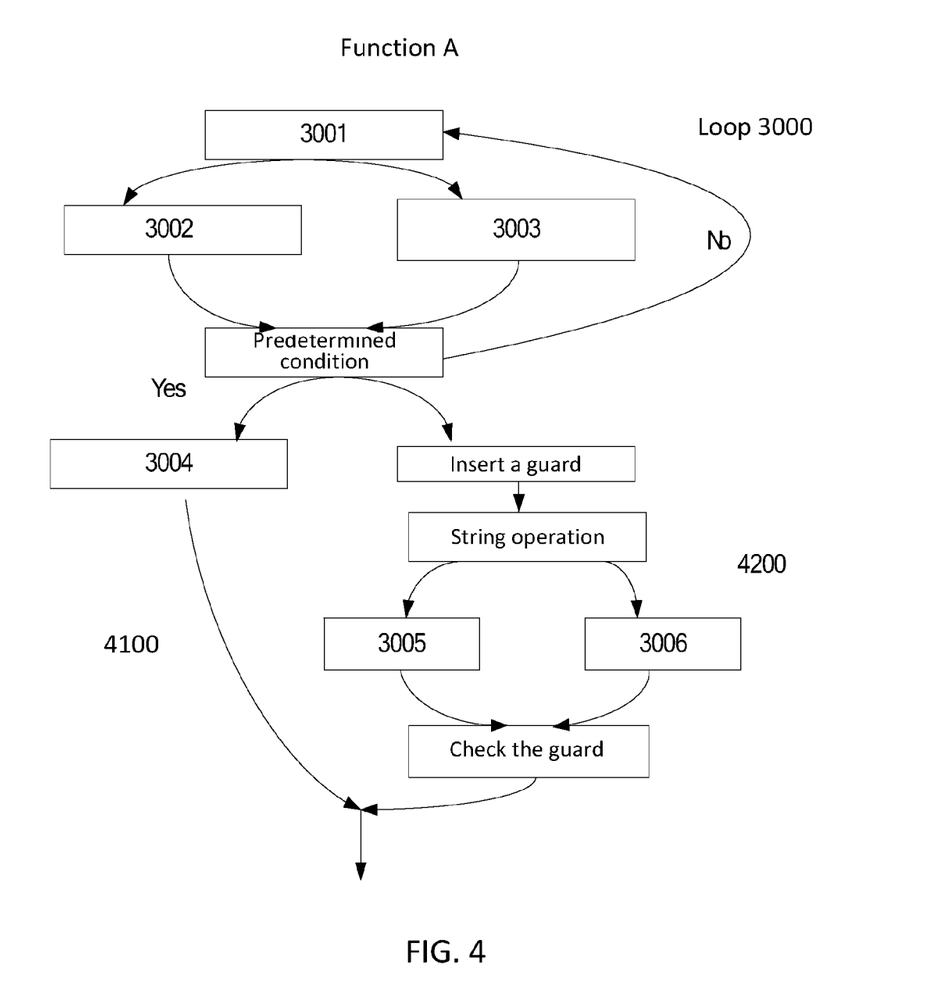
FIG. 4 shows an example embodiment of improved stack protection according to the present disclosure.

Therefore, as shown in FIG. 4, the present disclosure proposes to further divide function A, in which stack protection may be provided only in code region 3200 including a string operation, instead of protecting the entire function A. For clarity, in FIG. 4, same reference numbers are used for the components same as that in FIG. 3. As shown in the figure, at the time of compilation, the compiler may parse function A and obtains by analysis that the region with a string operation is region 4200. The above analysis can be implemented using the existing technology. Thus, the compiler may divide function A into loop 3000, code region 4100 and code region 4200 including a string operation.

Further, as described above, when function A is executed, the execution of program may choose the path of loop 3000 and code region 4100. This path does not involve string operations in the example embodiment, and thus it may be unnecessary to provide protection for this path. In contrast, it may only be necessary to provide stack protection for code region 4200 which involves string operation. In other words, when the execution of function enters code region 4200, it means that the execution of function may involve string operations. In this case, function A may involve stack overflow. Thus, it may be enough that stack protection is provided only when function executes region 4200.

As used herein, the term "code region" means a set of one or more codes. One of ordinary skill in the art will appreciate that, according to the embodiments of the present disclosure, one necessary condition for dividing code regions may include a determination of whether or not a string operation(s) is contained. Besides, other conditions for dividing code regions can be added based on particular applications.

For example, in FIG. 4, depending on whether or not a string operation is contained, string operation 3009 can be separately divided as one code region, while other parts of the function can serve as another code regions without string operations. In another embodiment, considering the completeness of a segment of codes as well as the relevancy between the codes, code region 4200 with string operation 3009 can be regarded as one code region.

One of ordinary skill in the art can understand that, there also exist other various rules for dividing code regions, which can be selected based on actual applications. However, according to the embodiments of the present disclosure, one condition for dividing code regions may be to see whether or not string operations are contained.

In one embodiment, the compiler may add a guard operation to region 4200. For example, a guard may be set up at a proper position of the stack when the function enters code region 4200 and the guard may be checked when leaving code region 4200. That is, the protection for the original function A may be moved into a part of the original function A.

When function A is executed, the executed operation may only include the path of loop 3000 and code region 4100. However, according to the present disclosure, the guard operation added by the compiler may not be locate in this path, but may be located in code region 4200. Therefore, compared to that function A executes the guard operation every time as shown in FIG. 3, the execution frequency of the guard operation added by the compiler may be reduced in the present disclosure. In other words, according to the present disclosure, it may only be necessary to perform protection operation only when the execution involves a specific part of function A, while it may not be necessary to provide protection for the entire function A.

In practice, under most situations, loop 3000 and code region 4100 may be the high-frequency code regions of a function, and code region 4200 involving a string operation may be a region of a relatively low operation frequency. Taking FIG. 4 as an example, one ordinary situation may proceed as follows: for example, loop 3000 involves some complicated computing works; when a predefined condition is satisfied, computation exists from loop 3000, the processing of the computation result passing code region 4100 may be treated as a resultant return of a function. On the other hand, code region 4200 may be merely used for outputting a predefined message or writing some messages into a log when error occurs in computation.

Such situations will make the effect of the present disclosure become more apparent. In most situations, a function may take branch loop 3000 and code region 4100. This path may not involve stack protection code added by the compiler. On the other hand, only in a relatively few number of situations of executing code region 4200, a function will involve codes added by the compiling device.

It can be seen that, when the function contains code regions having different execution frequencies, the present disclosure can enhance the execution efficiency of codes by changing the execution position of stack protection. Further, when the function contains a high frequency region and a low frequency region with a string operation which are significantly different in execution frequency, the present disclosure can provide higher code execution efficiency.

In another embodiment, it can be further determined whether or not to change the position of stack protection based on the execution frequency of code region 4200. In some embodiments, the lower the execution frequency of code region 4200 is, the more the performance obtained by changing the execution position of stack protection may be enhanced. In contrast, if the execution frequency of region 4200 is relatively high, the obtained performance may be less enhanced. Therefore, in one embodiment according to the present disclosure, when the execution frequency of code region 4200 is lower than a predetermined threshold, the position of stack protection may be moved. Otherwise, the position for executing stack protection may not be changed.

One of ordinary skill in the art would understand that, the execution frequency of a certain code region of a function described herein may mean a ratio of the total execution frequency of this region to the total execution frequency of this function. For example, when the function is executed 100 times and the region is executed 20000 times, then the execution frequency of this code region is 20000/100=200; if totally the region is executed 10 times, the frequency is 10/100=10%.

As known by one of ordinary skill in the art, when the compiler parses input codes, the execution frequencies of a certain function and a certain code region can be obtained by analysis. For example, the compiler can obtain the execution frequency of a function by analyzing a jump relation between functions, or, the compiler can insert detection points at various regions of a function to test and run this function, and may obtain the execution frequency of this function as well as the execution frequency of the code region based on the number of times that the program passes these detection points.

Figure 6:
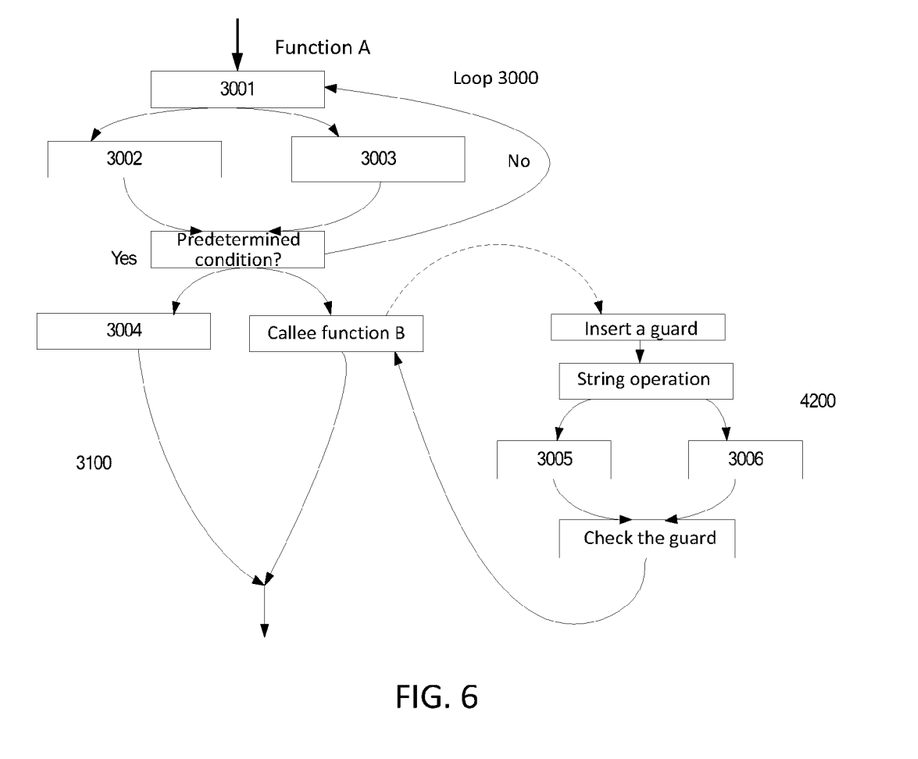
FIG. 6 shows another embodiment of improved stack protection according to the example embodiments of the present disclosure.

Some compilers may provide a predefined rule for stack protection. For example, in GCC or IBM® XL compiler, stack protection may be provided at an entry of each function. As for such compiler, related specific rules may be followed for applying the present disclosure. For example, in the above compiler, the code region with a string operation can be constructed to be a new function. This new function may serve as a callee function of the original function. As shown in FIG. 6, code region 4200 may be constructed to be a callee function B of function A. Also, stack protection may be set up in this function B. As for GCC or IBM® XL compiler, it may be possible to realize the above construction of function based on an outline functionality provided therein. This will be described in greater detail in the following particular embodiments.

One of ordinary skill in the art will understand that, based on the teachings of the present disclosure, the setup rules for stack protection by the respective compiler may not limit the implementation of the present disclosure.

Figure 5:
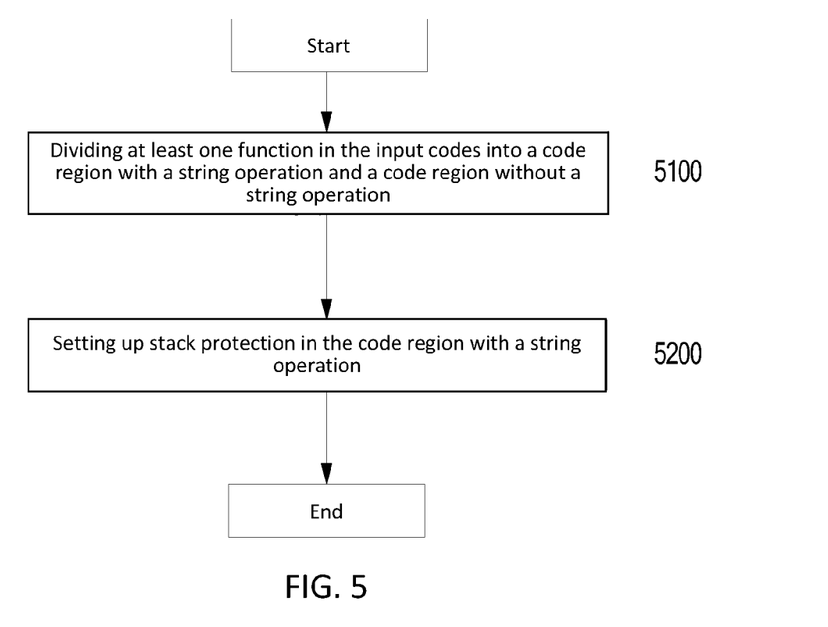
FIG. 5 shows a flowchart of an improved stack protection method according to an example embodiment of the present disclosure.

Below, the compiling method and the stack overflow protection device according to the embodiments of the present disclosure will be described. FIG. 5 shows a flowchart of the compiling method 5000 according to the embodiments of the present disclosure.

At block 5100, at least one function in input codes maybe divided into multiple code regions based on string operations. One of ordinary skill in the art may understand that, the existing compilers may be capable of parsing whether or not the multiple code regions in the function contain string operations. For example, the GCC, IBM® XL compiler or the like may generally provide such functionality.

At block 5200, stack protection may be set up in the code region including a string operation.

According to an example embodiment of the present disclosure, the position where stack protection is executed can be changed so as to be applicable to all code regions with string operations.

On the other hand, in another example embodiment, considering the execution frequency of a code region involving a string operation, it may be possible to move stack protection into a low frequency code region only. In one embodiment, only when the execution frequency of the code region is smaller than a predetermined threshold, the execution position of stack protection may be moved from the entry of the original function to this code region.

As used herein, the term "low frequency" is a relative concept. In one embodiment, the predetermined threshold may be a constant less than 50%. For example, feasible examples are 40%, 30%, 20%, 10%, 5%, or the like, but the present disclosure is not limited to this.

In another embodiment, the threshold can be determined based on a statistically calculated result. For example, using the importance of a function to which the respective code regions belong as a weight, the weighted average of execution frequency for all the low frequency code regions with string operations may be calculated. For the code regions whose execution frequencies are less than the value of the weighted average, stack protection position may be changed. For the code regions whose execution frequencies are higher than the value of the weighted average, the execution position of stack protection may not changed. One of ordinary skill in the art can vary the implementation of weighted average operation based on particular applications.

Depending on the rules of the compiler, the low frequency code region can be constructed to be a new function. As shown in FIG. 6, code region 4200 may be constructed to be a function B which serves as a callee of function A. The code for protection measurement may move from function A into function B. This may allow other paths of function A to not be subjected to stack protection, thereby enhancing the execution frequency of the code. One of ordinary skill in the art knows that, since a function may have a single entry and a single exit (i.e., all the possible program streams in a function may enter the function via only one entry and may leave the function via also one exit), the code region to be constructed to be a function also may be divided to a single entry and a single exit.

The construction of function B can be realized by the functionality provided by some compilers. For example, for GCC, IBM® XL compiler, they provide outline functionality. Outline can construct a portion of the source codes to be a new function, and automatically establish call entry and exit preparation, parameter list and delivery, function call for this function.

It is noted that, although the execution of stack protection may be set up in the callee function, it may still protect the stack of the original function. This may be because, the callee function may still be a part of the original function, and thus, it may be possible to insert the guard into the stack of the original function so long as the stack position of the original function can be obtained by calculation, thereby performing protection for the entire original function. Below, the above contents will be described in conjunction with FIG. 7.

Figure 7:
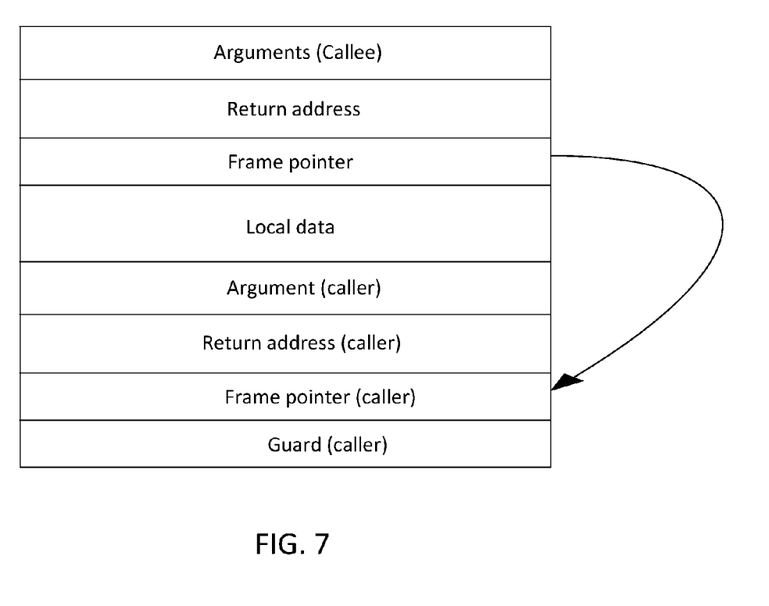
FIG. 7 shows details of stack protection according to one example embodiment of the present disclosure.

FIG. 7 shows the processing of guard setup according to this optional embodiment. The guard can be set up for the callee function through the following schematic codes.

```
//guard check
//get caller's FramePointer
LOAD r9=[FP]
STORE [r9-4]=_magic_number
```

Wherein, FP represents the frame pointer of the original function (e.g. function A in FIG. 4), while the numerical value 4 may be the length of the frame pointer specified by the compiler. Since the stack grows upwards, (r9-4) represents the beginning position of function A. The numerical value of the guard "_magic_number" may be inserted at this position. One of ordinary skill in the art should understand that, "_magic_number" herein can be any proper numerical value.

On the other hand, the exemplary codes for checking the guard may be as follows:

```
//guard check
LOAD r9=[FP]
LOAD r10=[r9-4]
COMPARE r10,_magic_number
```

When checking, it is still to find the entry address of the original function A and then may move it by 4 bits. At that position, it may be possible to obtain the check value previously stored, and this check value may be compared with the predetermined value.

One of ordinary skill in the art can understand that, it may be possible to obtain the position where the protection execution may be inserted similarly by the compiler and to add stack protection in a similar manner without outline.

Figure 8:
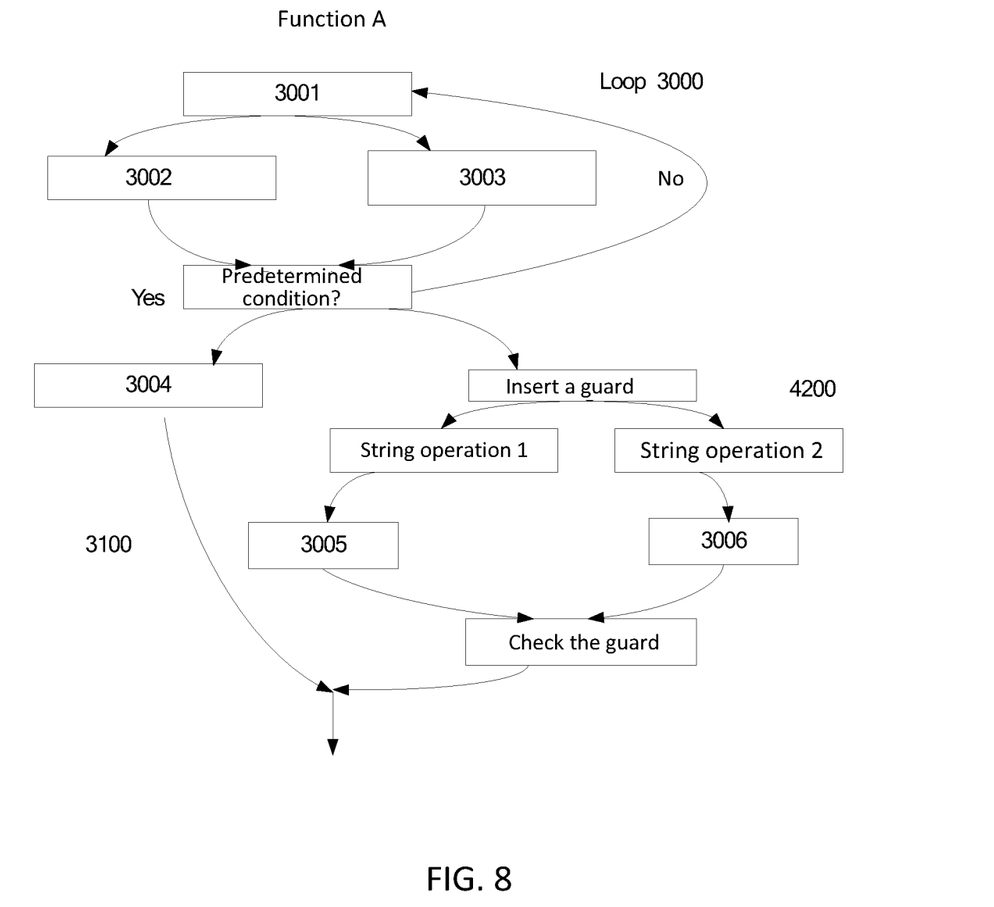
FIG. 8 shows another embodiment of improved stack protection according to the example embodiments of the present disclosure.

In some cases, a plurality of string operations may be contained in the low frequency code region of the function. As shown in FIG. 8, code region 4200 of function A may contain two string operations (or more string operations). As described above, since the stack protection set up at this position may still protect the stack of the original function A, it may be possible to set up code protection for the two string operations all together. In other situation, function A can have a plurality of string operations contained in different low frequency code regions. For example, function A may further include low frequency code regions 4300 and 4400 (not shown) parallel to code region 4200. The low frequency code regions 4300 and 4400 may both have string operations. As for the above situation, so long as there is no high frequency code region between the respective low frequency code regions, it may be possible to set up stack protection all together for the above plurality of low frequency code regions. This may be good for further enhancing the code execution efficiency after compilation. One of ordinary skill in the art should understand that, in some possible situations, the low frequency code region containing a plurality of string operations can be outlined to be a new function. This may be helpful for further enhancing the code execution efficiency after compilation.

Likewise, in a case where code region 4200 is outlined to be a callee function, string operation 1 and string operation 2 can be outlined to one and the same callee function. Or, likewise, when there is no high frequency code region between those low frequency code regions, the plurality of low frequency code regions can be outlined to be a callee function, and the execution of stack protection may be moved into the callee function.

Below, the compiling device according to the embodiments of the present disclosure will be described based on the figures.

Figure 9A:
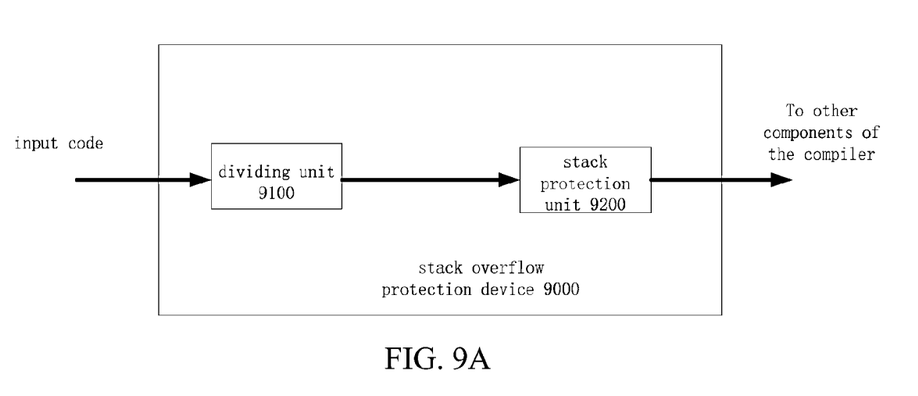
FIGS. 9A and 9B show a stack overflow protection device according to example embodiments of the present disclosure.

FIG. 9A shows a stack overflow protection device 9000 according to one embodiment of the present disclosure. The device 9000 may include a dividing unit 9100 and a stack protection unit 9200. The dividing unit 9100 may divide at least one function in input codes into multiple code regions based on the string operations in the function. The stack protection unit 9200 may move the stack protection for this function into the code region with string operations. In one embodiment, stack protection may be employed the form of a guard. In other embodiments, one of ordinary skill in the art also can image other feasible stack protection measurement.

After the dividing unit 9100 may divide the function into a code region with a string operation and a code region without a string operation, in one embodiment according to the present disclosure, the dividing unit 9100 can further divide the code region with a string operation into a high frequency code region and a low frequency code region based on the execution frequency. The stack protection unit 9200 may move the stack protection measurement for the original function into a low frequency code region.

Figure 9B:
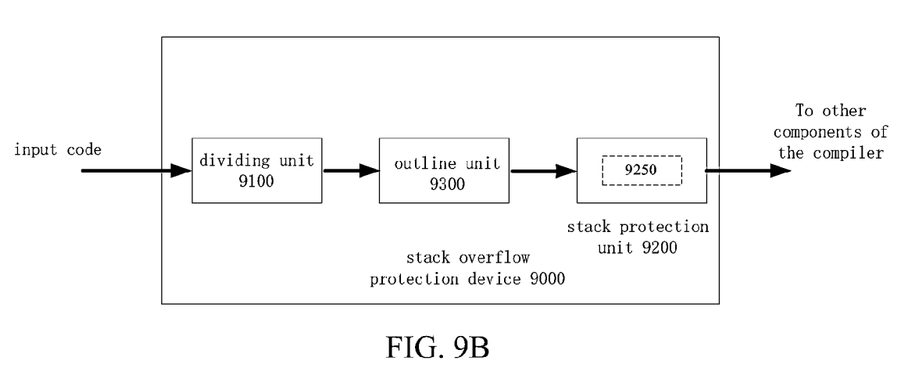

According to an example embodiment of the present disclosure, as shown in FIG. 9B, the stack overflow protection device 9000 may further include an outline unit 9300. The outline unit 9300 may outline the code region with a string operation to be a callee function of the original function based on the predefined compiling rules. The stack protection unit 9200 may move the stack protection for the original function into the outlined callee function based on the outline result of the outline unit 9300. In an example embodiment, the stack protection unit 9200 can further comprise a guard application unit 9250. As described above, the guard application unit 9250 may calculate the position where the guard is to be inserted based on the frame pointers of the callee function and the original function. In this embodiment, the guard may protect the stack of the original function.

Similarly, in the embodiment having an outline unit 9300, the outline unit 9300 may outline the low frequency code region to be a callee function of the original function. The stack protection unit 9200 may move the stack protection measurement for the original function into the callee function. In one embodiment, the low frequency can refer to an embodiment in which the execution frequency is less than 50% of the threshold. However, one of ordinary skill in the art can select other thresholds based on actual applications. In one embodiment, the predefined threshold may be a constant less than 50%. For example, feasible examples are 40%, 30%, 20%, 10%, 5%, or the like, but the present disclosure is not limited to this.

In another embodiment, the threshold can be determined based on a statistically calculated result. For example, using the importance of the respective functions as a weight, weighted average operation may be performed for the executions frequencies of all the code regions with string operations. For the code regions (callee function) whose execution frequencies are less than the value of the weighted average, stack protection position may be changed. For the code regions (callee function) whose execution frequencies are higher than the value of the weighted average, the execution position of stack protection may not changed. One of ordinary skill in the art can vary the implementation of weighted average operation based on particular applications.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various embodiments of the present disclosure have been described above. However, these embodiments are merely illustrative but not exclusive, and the present disclosure is not limited to these disclosed embodiments. Many modifications and variations are obvious for one of ordinary skill in the art without departing from the scope and spirit of various embodiments described above. The terms used herein are selected such that they can best explain the principle of various embodiments, the actual application or the technical improvement on the technology in the market, or such that one of ordinary skill in the art can understand various embodiments disclosed herein.

What is claimed is:

1. A method for providing input source codes with stack overflow protection, comprising:
   dividing, by a computing device, at time of compilation, at least one function in the input source codes into a code region with a string operation and a code region without a string operation;
   setting up, the computing device, stack protection in the code region with the string operation based upon the code region of the at least one function having the string operation, wherein the stack protection unit is further configured to exclude stack protection in the code region without the string operation based upon the code region of the at least one function lacking the string operation;
   outlining the code region with a string operation to be a callee function of said function;
   said setting up stack protection in said code region with a string operation comprises: setting up stack protection in said callee function;
   dividing said code region with a string operation into a high frequency code region and a low frequency code region based on execution frequencies of the code regions;
   said outlining said code region with a string operation to be a callee function of said function comprises: outlining said low frequency code region to be the callee function of said function;
   calculating a position where the stack protection operation is to be set up according to frame pointers of said callee function and said function; and
   setting up the stack protection operation in said callee function based on the calculated position.

2. The method according to claim 1, further comprising:
   dividing said code region with a string operation into a high frequency code region and a low frequency code region based on execution frequencies of the code regions; and
   said setting up stack protection in the code region with a string operation comprises: setting up stack protection in said low frequency code region.

3. The method according to claim 2, wherein, the execution frequency of said low frequency code region is less than a predetermined threshold.

4. The method according to claim 1, said outlining said low frequency code region to be a callee function of said function comprises:
   when the function includes a plurality of low frequency string operations and no high frequency operation between the low frequency string operations, outlining said plurality of low frequency string operation into the callee function.

5. The method according to claim 3, wherein, said predetermined threshold is determined based on statistic data of the execution frequencies of said low frequency code regions.

6. A device having a processor for providing input source codes with stack overflow protection, comprising:
   a dividing unit configured to divide, at time of compilation, at least one function in the input source codes into a code region with a string operation and a code region without a string operation;
   a stack protection unit configured to set up stack protection in the code region with the string operation based upon the code region of the at least one function having the string operation, wherein the stack protection unit is further configured to exclude stack protection in the code region without the string operation based upon the code region of the at least one function lacking the string operation;
   an outline unit configured to outline the code region with a string operation to be a callee function of said function;
   said stack protection unit is configured to set up stack protection in said callee function;
   said dividing unit is further configured to divide said code region with a string operation into a high frequency code region and a low frequency code region based on execution frequencies of the code regions;
   said outline unit is further configured to outline said low frequency code region to be the callee function of said function;
   wherein, said stack protection unit comprises a guard application unit configured to set up a stack protection operation in said callee function;
   wherein, said guard application unit calculates a position where the stack protection operation is to be set up according to frame pointers of said callee function and said function, and sets up the stack protection operation in said callee function based on the calculated position.

7. The device according to claim 6, wherein the dividing unit is further configured to divide said code region with a string operation into a high frequency code region and a low frequency code region based on execution frequencies of the code regions; and
   said stack protection unit is further configured to set up stack protection in said low frequency code region.

8. The device according to claim 7, wherein the execution frequency of said low frequency code region is less than a predetermined threshold.

9. The device according to claim 6, wherein, when said function includes a plurality of low frequency string operations and no high frequency operation between the low frequency string operations, said outline unit is configured to outline said plurality of low frequency string operations into the callee function.

10. The device according to claim 8, wherein, said predetermined threshold is determined based on statistic data of the execution frequency of said low frequency code regions.

11. A compiler stored in a non-transitory computer readable medium comprising:
a dividing unit configured to divide, at time of compilation, at least one function in an input source codes into a code region with a string operation and a code region without a string operation; and
a stack protection unit configured to set up stack protection in the code region with the string operation based upon the code region of the at least one function having the string operation, wherein the stack protection unit is further configured to exclude stack protection in the code region without the string operation based upon the code region of the at least one function lacking the string operation;
an outline unit configured to outline the code region with a string operation to be a callee function of said function;
said stack protection unit is configured to set up stack protection in said callee function;
said dividing unit is further configured to divide said code region with a string operation into a high frequency code region and a low frequency code region based on execution frequencies of the code regions;
said outline unit is further configured to outline said low frequency code region to be the callee function of said function;
wherein, said stack protection unit comprises a guard application unit configured to set up a stack protection operation in said callee function;
wherein, said guard application unit calculates a position where the stack protection operation is to be set up according to frame pointers of said callee function and said function, and sets up the stack protection operation in said callee function based on the calculated position.

12. A computing device having a processor comprising:
a compiler comprising:
a dividing unit configured to divide, at time of compilation, at least one function in an input source codes into a code region with a string operation and a code region without a string operation;
a stack protection unit configured to set up stack protection in the code region with the string operation based upon the code region of the at least one function having the string operation, wherein the stack protection unit is further configured to exclude stack protection in the code region without the string operation based upon the code region of the at least one function lacking the string operation;
an outline unit configured to outline the code region with a string operation to be a callee function of said function;
said stack protection unit is configured to set up stack protection in said callee function;
said dividing unit is further configured to divide said code region with a string operation into a high frequency code region and a low frequency code region based on execution frequencies of the code regions;
said outline unit is further configured to outline said low frequency code region to be the callee function of said function;
wherein, said stack protection unit comprises a guard application unit configured to set up a stack protection operation in said callee function;
wherein, said guard application unit calculates a position where the stack protection operation is to be set up according to frame pointers of said callee function and said function, and sets up the stack protection operation in said callee function based on the calculated position.

* * * * *